United States Patent Office

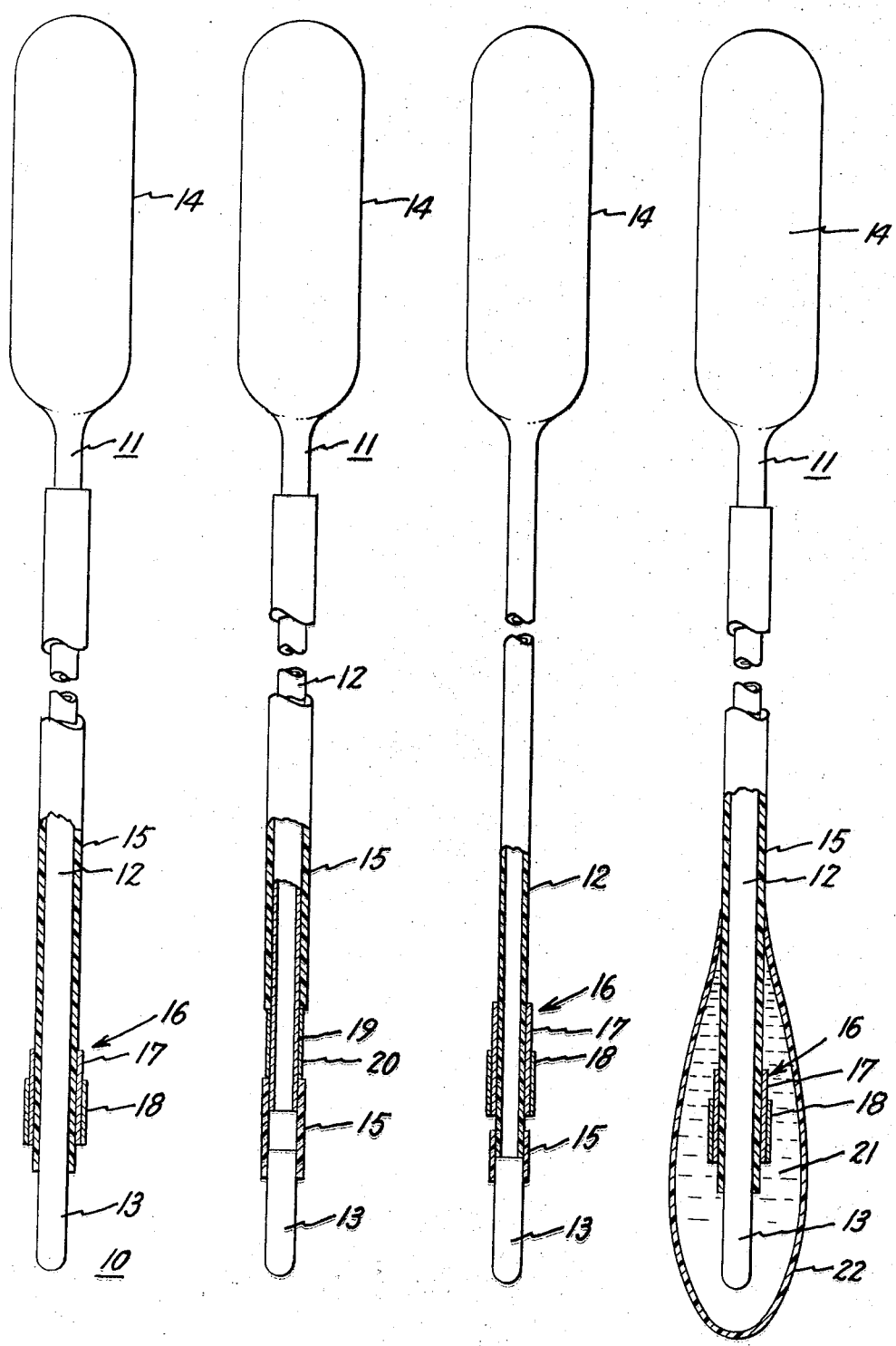

3,835,013
Patented Sept. 10, 1974

3,835,013
OXYGEN SENSOR AND ELECTRODE DEVICE THEREFOR
Willard T. Grubb and Lawrence H. King, Schenectady, N.Y., assignors to General Electric Company, Schenectady, N.Y.
Filed Feb. 1, 1973, Ser. No. 328,755
Int. Cl. G01n 27/46
U.S. Cl. 204—195 P                                                                7 Claims

ABSTRACT OF THE DISCLOSURE

An oxygen sensor is described which has an electrode device with a first electrode and a reference electrode, and an aqueous buffered solution of an electrolyte containing a halide salt which contacts the noble metal portion of the first electrode and the silver halide layer of the reference electrode of the electrode device.

The electrode device has a chemically-biased oxygen-sensing electrode with a closed-end tube, the tube having a portion of a noble metal selected from the class consisting of palladium and palladium alloys, a reservoir for hydrogen connected to the opposite end of the tube, and a hydrogen gas source contained within at least the reservoir; a layer of electrical insulation covering at least partially the tube leaving the noble metal portion at least partially exposed, and a reference electrode insulated electrically from the noble metal portion, the reference electrode consisting of silver with at least a partial layer of silver halide thereon.

---

Reference is made to our copending patent application entitled "Chemically-Biased Electrode" filed Feb. 1, 1973 and given Ser. No. 328,754, which describes and claims a chemically-biased oxygen-sensing electrode comprising a closed-end tube, the tube having a portion of a noble metal selected from the class consisting of palladium and palladium alloys, and a reservoir for hydrogen connected to the opposite end of the tube. This copending application is assigned to the same assignee as the present application.

The present invention relates to an oxygen sensor and electrode device therefor and, more particularly, to such an oxygen sensor and electrode device therefor in which the electrode device includes both electrodes.

Oxygen sensors are known in the prior art for determining oxygen content of a sample. Such a sensor has a pair of electrodes that are connected by means of an electrolyte medium. The electric circuit parameters of this device change when exposed to materials having different oxygen content as, for example, oxygen from blood when passing into the sensor electrolyte changes the voltage between the two electrodes and the change is a well-defined function of the oxygen content of the sample.

The primary objects of our invention are to provide a rugged and dependable oxygen sensor and electrode device which are suitable for biomedical, environmental control, and other applications.

In accordance with one aspect of our invention an electrode device comprises a first chemically-biased oxygen-sensing electrode having a hollow, tubular closed-end electrode, a palladium or a palladium alloy portion and a hydrogen reservoir connected to the opposite end, and a reference electrode insulated electrically from the noble metal portion.

These and various other objects, features and advantages of the invention will be better understood from the following description taken in connection with the accompanying drawing in which:

FIG. 1 is a partial sectional view of an electrode device made in accordance with our invention;

FIG. 2 is a partial sectional view of a modified electrode device;

FIG. 3 is a partial sectional view of a further modified electrode device; and

FIG. 4 is a partial sectional view of an oxygen sensor made in accordance with our invention.

In FIG. 1 of the drawing, there is shown generally at 10 an electrode device embodying our invention. Electrode device 10 is shown with a first chemically-biased oxygen-sensing electrode 11 which is shown with closed-end tube 12, a closed-end portion designated 13, a hydrogen reservoir 14 connected to the opposite end of tube 12, and hydrogen gas (not shown) contained within reservoir 14, tube 12, and closed-end portion 13. Tube 12 including closed-end portion 13 and reservoir 14 are made of palladium or a palladium alloy. A layer of electrical insulation 15 covers at least partially tube 12 leaving noble metal portion 13 at least partially exposed.

Electrode device 10 has a reference electrode 16 surrounding partially tube 12 by being positioned around a portion of insulation 15. Reference electrode 16 comprises a layer 17 of silver, for example, in the form of a tube with a layer 18 of silver halide thereon. Reference electrode 16 is insulated electrically from noble metal portion 13 of first electrode 11 by insulation 15. An electrical lead (not shown) can be attached to an exposed metal portion of the first electrode while a second electrical lead (not shown) can be attached to reference electrode 16.

In FIG. 2 of the drawing there is shown a modified electrode device with a first chemically-biased oxygen-sensing electrode 11 which is shown with a closed-end tube 12, a closed-end portion designated 13, a hydrogen reservoir 14 connected to the opposite end of tube 12 and hydrogen gas (not shown) contained within reservoir 14, tube 10 and closed-end portion 13. For example, both tube 12 and reservoir 14 are made of a metal such as silver. The closed-end portion 13, which is made of palladium or palladium alloy, is shown physically connected to one end of tube 11 but electrically insulated therefrom by a layer of electrical insulation 15, such as a polyolefin polymer, which covers partially a portion of tube 12 and a portion of closed-end portion 13.

The electrode device has a reference electrode which comprises an initially exposed area 19 of silver tube 12 with a layer 20 of silver halide thereon. The reference electrode is insulated from noble metal portion 13 of the first electrode by insulation 15. Additionally, electrical insulation 15 covers partially tube 12. An electrical lead (not shown) can be attached to closed-end portion 13 of the first electrode while a second electrical lead (not shown) can be attached to the reference electrode.

In FIG. 3 of the drawing, there is shown a further modified electrode device with a first chemically-biased oxygen-sensing electrode which is shown with a closed-end tube 12, a closed-end portion designated 13, a hydrogen reservoir 14 connected to the opposite end of tube 12, and hydrogen gas (not shown) contained within reservoir 14, tube 12 and closed-end portion 13. Tube 12 and reservoir 14 are shown as made of a chemically inert fluid impermeable material such as a polyolefin polymer. Closed-end portion 13 is made of palladium or palladium alloy. Closed-end portion 13 is connected to the open end of tube 12 and held in position by a layer 15 of electrical insulation which covers partially a portion of tube 12 and a portion of the closed end 13.

The electrode device has a reference electrode 16 surrounding partially tube 12 by being positioned directly around the tube. Reference electrode 16 comprises a layer 17 of silver, for example, in the form of a tube with a layer 18 of silver halide thereon. Reference electrode 16 is insulated electrically from noble metal portion 13 of the first electrode by insulation 15 and by tube 12. An electrical lead (not shown) can be attached to closed-end portion 13 of the first electrode while a second electrical lead (not shown) can be attached to the reference electrode 16.

In FIG. 4 of the drawing, there is shown an oxygen sensor which employs electrode device 10 shown in FIG. 1 of the drawing. An aqueous buffered solution 21 of an electrolyte containing a halide salt contacts at least the closed-end portion 13 of first electrode 11, and the silver halide layer 18 of reference electrode 16. An outer sheath 22 of an oxygen permeable, ion-impermeable diffusion barrier material encapsulates at least aqueous solution 21, closed-end portion 13 of first electrode 11, and silver halide layer 18 of reference electrode 16 in contact with aqueous solution 21. A high impedance voltmeter (not shown) is connected by leads (not shown) to first electrode 11 and reference electrode 16.

In our above-mentioned copending patent application S.N. 328,754, there is described and claimed a chemically-biased oxygen-sensing electrode which has a closed-end tube, the tube having a portion of a noble metal selected from the class consisting of palladium and palladium alloys, and a reservoir for hydrogen connected to the opposite end of the tube.

We found unexpectedly that we could form an electrode device employing the above chemically-biased oxygen-sensing electrode as the first electrode and a reference electrode in a single, unitary structure. We found that we could surround partially the tube of the first electrode with the reference electrode by positioning the reference electrode therearound and insulating electrically the reference electrode from the noble metal portion of the first electrode. The reference electrode comprises a layer of silver, and at least a partial layer of silver halide on the silver layer.

We found further that we could form an oxygen sensor by contacting the noble metal portion of the first chemically-biased electrode, and the silver halide layer of the reference electrode with an aqueous solution of a buffered electrolyte containing a halide salt. We found also that we could form an oxygen sensor by encapsulating the above aqueous solution within an oxygen permeable, ion-impermable diffusion barrier whereby the noble metal portion of the first electrode and the silver halide layer of the reference electrode are in contact with the aqueous solution and enclosed by the barrier.

In our electrode device, the hydrogen gas source reservoir provides for use of the electrode over an arbitrary period of time. Such a reservoir can be made in a variety of shapes and from a variety of materials. The hydrogen gas reservoir can contain hydrogen gas or hydrogen producing chemicals, such as, thermally decomposable hydrides or substances that undergo catalytic dehydrogenation. Further, the hydrogen gas reservoir can contain electrodes for the electrochemical generation of hydrogen gas. Such reservoir can be provided with a valve or break-off seal between the reservoir and the tube of the electrode. In addition to being filled with a hydrogen gas source and sealed, the reservoir can be provided with refillable means, such as, for example, a removal closure.

We found that the tube can be made of a variety of materials. However, the tube must have a portion made of palladium or a palladium alloy for the hydrogen to diffuse therethrough. Various palladium alloys are useable. For example, a palladium-25 weight percent silver alloy is suitable. While the tube portion of palladium or a palladium alloy can be any portion of the tube, we found it desirable to use as the closed-end portion.

If desired, the closed-end tube and reservoir can be made of a unitary structure of palladium or a palladium alloy as shown in FIG. 1. However, in FIG. 2 the tube and reservoir are made of a metal such as silver while the closed-end portion is palladium or a palladium alloy. Further, the closed-end portion is physically connected to the tube by a segment of electrical insulation whereby the closed-end portion and tube are electrically insulated from one another. The tube and reservoir are shown in FIG. 3 as being made of an electrically insulating polyolefin polymer. The tube has a palladium or a palladium alloy closed-end portion butted against the open end of the tube.

Other materials which are electrically insulating or electrically conductive can be employed. For example, other polymers, stainless steel, steel, ceramics and glasses are suitable.

Various electrical insulating materials are useable to cover partially the tube and some can be applied by coating steps. Preferred polymer materials include hexafluoropropylene-vinylidene fluoride rubber, polyester resin lacquer, silicone rubbers, polyolefins, epoxy resins, etc. We can also employ a polyester resin lacquer which provides the desired electrical insulation and which can be applied by coating or dipping. The polyester resin lacquer can be cross-linked by heating to insolubility and therefore facilitates the application of successive layers. Electrically insulating ceramics and glasses are also suitable.

The reference electrode is a silver-silver halide electrode. This electrode can be formed by depositing a silver bromide layer on a silver base such as a silver tube. In FIG. 2, exposed portion 19 of tube 12 provides the silver base. Other silver halides except fluorides are useful.

Such electrode device is formed into an oxygen sensor by employing an aqueous buffered solution of an electrolyte containing a halide salt which solution contacts the noble metal portion of the first electrode and the silver halide layer of the reference electrode.

The aqueous solution can be made from a broad range of aqueous buffered electrolytes containing a halide salt. Such suitable electrolytes include a buffered aqueous solution of a halide salt corresponding to the silver halide, for example, potassium chloride or sodium chloride, or a saturated solution of the silver halide itself. The buffer which is in the vicinity of pH 5.0 is, for example, a phthalate or a phosphate buffer. A gelling agent can also be incorporated into the aqueous electrolyte providing a gelled solution. For example, suitable gelled aqueous electrolytes include an aqueous solution of a soluble halide salt corresponding to the halide in the silver halide layer, a buffering couple such as phthalate or phosphate preferably in the vicinity of pH 5.0, and a gelling agent. Such gelling agents include agar, methyl cellulose, ethyl cellulose, guar gums, polyacrylates, polyethers, polyamides, etc. The electrodes are connected across a voltmeter for voltage measurement.

Such an electrode structure is formed into an oxygen sensor by contacting, such as by immersing, at least the noble metal portion of the first electrode, and the silver halide layer of the reference electrode with an aqueous buffered solution, as above described, of an electrolyte containing a halide salt. An outer sheath of oxygen permeable, ion-impermeable diffusion is provided around the aqueous solution, for example, by immersing the solution covered portion of the electrode device in solution of the barrier sheath material in a suitable solvent. Upon evaporating the solvent, the sheath encapsulates at least the aqueous solution, and the portions of the first and second electrodes in contact with the aqueous solution. Various oxygen diffusion barrier materials are suitable as an outer sheath to encapsulate the aqueous solution and the portions of the first electrode and the silver halide layer of the reference electrode in contact with the aqueous solution. The oxygen permeable, ion-impermeable diffusion barrier material must have high resistivity and have an appropriate permeability coefficient for the oxygen to be sensed. Suitable materials include silicone-polycarbonate copolymers, hexafluoroproylene-vinylidene fluoride rubber and silicone rubbers.

Examples of electrode devices and oxygen sensors made in accordance with our invention are as follows:

Example I

The electrode device is formed by first making a chemically-biased oxygen-sensing electrode from a palladium tube with a wall thickness of about 0.01 inch, a closed-end portion at one end of the tube, and a hydrogen reservoir connected to the opposite end of the tube which consisted of a hydrogen cylinder. The bore of the tube, and of the closed-end portion were also filled with hydrogen gas. The exterior surface of the tube was electrically insulated with heat shrinkable polyethylene tubing. A reference electrode is formed to surround partially the tube by affixing a short length of silver tube directly around the polyethylene tubing. A silver bromide layer is formed on the exterior surface of the silver tube. An electrical lead is connected to the first electrode and an electrical lead is connected to the reference electrode. The resulting structure is an electrode device.

Example II

An electrode device is formed by first making a chemically-biased oxygen-sensing electrode from silver tube with a reservoir at one end of the tube. A closed end palladium portion is connected to the opposite end of the silver tube and spaced therefrom by a layer of heat shrinkable polyethylene tubing which covers a portion of the exterior surface of the tube portion and a portion of the exterior surface of the closed-end portion. A portion of the exterior surface of the silver tube is left exposed. The remainder of the silver tube is insulated with heat shrinkable polyethylene tubing. The bore of the tube portion and of the closed-end portion and the interior of the reservoir are filled with hydrogen gas. A reference electrode is formed by applying a layer of silver bromide on the exposed silver tube segment. The resulting device is an electrode device.

Example III

An oxygen sensor was made to demonstrate the feasibility of our electrode device in an oxygen sensor by employing the chemically-biased electrode made in accordance with Example I. A reference electrode was employed which consisted of a silver wire with a layer of silver bromide adjacent one end thereof. The remainder of the exterior surface of the reference wire was covered with heat shrinkable polyethylene tubing. The closed-end portion of the chemically-biased oxygen-sensing electrode and the silver bromide portion of the reference electrode were immersed in a pH 5 phosphate buffer containing 0.15 molar sodium bromide. An electrical lead was connected to each of the electrodes and across a voltmeter for measurement.

Example IV

The oxygen sensor of Example III was tested by measuring the voltage of the cell as the electrolyte was swept with gases containing from 2 to 100% oxygen. This test showed that the voltage of the chemically-biased oxygen-sensing electrode was approximately linear with the log of oxygen partial pressure. The results of this test are set forth below in Table I wherein oxygen partial pressure in millimeters is measured against voltage in millivolts.

TABLE I

| Oxygen Partial Pressure—mm. | Voltage—Millivolts |
|---|---|
| 15.5 | −240 |
| 75.0 | −160 |
| 154.0 | −135 |
| 740.0 | −87 |

During 60 hours of the above air-oxygen cycling the absolute voltage values became less negative by about 50 millivolts but the voltage change per decade change of oxygen pressure shifted only from 68 millivolts to 67 millivolts. The response time was very good. The 99% voltage shift from oxygen to air took about 1.5 minutes and from air to oxygen about 1 minute.

While other modifications of the invention and variations thereof which may be employed within the scope of the invention have not been described, the invention is intended to include such as may be embraced within the following claims:

What we claim as new and desire to secure by Letters Patent of the United States is:

1. An electrode device comprising a first chemically-biased oxygen-sensing electrode, the first electrode comprising a closed-end tube, the tube having a portion of a noble metal selected from the class consisting of palladium and palladium alloys, a reservoir for hydrogen connected to the opposite end of the tube, and a hydrogen gas source contained within at least the reservoir, a layer of electrical insulation covering at least partially the tube leaving the noble metal portion at least partially exposed, and a reference electrode in contact with the layer of electrical insulation and insulated electrically from the noble metal portion, the reference electrodes comprising a layer of silver and at least a partial layer of silver halide on the silver layer.

2. In an electrode device as in claim 1, in which the noble metal portion is the closed-end portion.

3. In an electrode device as in claim 1, in which the layer of silver in the reference electrode is an exposed segment of the tube.

4. In an electrode device as in claim 1, in which the tube and the reservoir are of a chemically inert, fluid impermeable material.

5. In an electrode device as in claim 4, in which the tube and the reservoir are of a polyolefin polymer.

6. An oxygen sensor comprising a first chemically-biased oxygen-sensing electrode, the first electrode comprising a closed-end tube, the tube having a portion of a noble metal selected from the class consisting of palladium and palladium alloys, a reservoir for hydrogen connected to the opposite end of the tube, and a hydrogen gas source contained within at least the reservoir, a layer of electrical insulation covering at least partially the tube leaving the noble portion at least partially exposed, a reference electrode in contact with the layer of electrical insulation and insulated electrically from the noble metal portion, the reference electrode comprising a layer of silver and at least a partial layer of silver halide on the silver layer, and an aqueous buffered solution of an electrolyte containing a halide salt contacting the noble metal portion of the chemically-biased oxygen-sensing electrode and the silver halide layer of the reference electrode.

7. An oxygen sensor comprising a first chemically-biased oxygen sensing eelctrode, the first electrode comprising a closed-end tube, the tube having a portion of a noble metal selected from the class consisting of palladium and palladium alloys, a reservoir for hydrogen connected to the opposite end of the tube and a hydrogen gas source contained within at least the reservoir, a layer of electrical insulation covering at least partially the tube leaving the noble metal portion at least partially exposed, a reference electrode insulated electrically from the noble metal portion, the reference electrode comprising a layer of silver and at least a partial layer of silver halide on the silver layer, an aqueous buffered solution of an electrolyte containing a halide salt contacting the noble metal portion of the chemically-biased oxygen-sensing electrode and the silver halide layer of the referenc electrode, and an outer sheath of oxygen permeable, ion-impermeable diffusion barrier material encapsulating at least the aqueous buffered solution, a portion of the first electrode, and the silver halide layer of the reference electrode in contact with the aqueous solution.

References Cited

UNITED STATES PATENTS

| | | | |
|---|---|---|---|
| 3,701,632 | 10/1972 | Lovelock | 204—195 P |
| 3,709,812 | 1/1973 | Niedrach et al. | 204—195 P |
| 2,755,243 | 7/1956 | Bechman et al. | 204—195 G |
| 3,719,576 | 3/1973 | Macur | 204—195 P |
| 3,080,304 | 3/1963 | Andrus | 204—129 |
| 2,882,212 | 4/1959 | Beard | 204—195 R |
| 2,749,293 | 6/1956 | Wahlin | 204—129 |

TA-HSUNG TUNG, Primary Examiner

U.S. Cl. X.R.

204—195 R